United States Patent
Paul et al.

Patent Number: 5,632,253
Date of Patent: May 27, 1997

[54] UNIVERSAL COMBUSTION SYSTEM

[76] Inventors: Marius A. Paul; Ana Paul, both of 1120 E. Elm Ave., Fullerton, Calif. 92631

[21] Appl. No.: 633,673

[22] Filed: Apr. 17, 1996

[51] Int. Cl.⁶ .................................................. F02M 23/00
[52] U.S. Cl. .................................................. 123/531
[58] Field of Search .......................... 123/531, 533, 123/527, 525, 472; 239/1, 5, 403, 406, 409

[56] References Cited

U.S. PATENT DOCUMENTS

| | | | |
|---|---|---|---|
| 4,046,112 | 9/1977 | Deckard | 123/531 |
| 4,465,050 | 8/1984 | Igashira et al. | 123/472 |
| 4,781,164 | 11/1988 | Seeber | 123/533 |
| 4,938,417 | 7/1990 | Halvorsen | 239/5 |
| 4,945,877 | 8/1990 | Ziegler et al. | 123/472 |
| 5,161,511 | 11/1992 | Ketterer | 123/531 |
| 5,193,743 | 3/1993 | Romann et al. | 239/1 |
| 5,218,943 | 6/1993 | Takeda et al. | 123/531 |
| 5,220,899 | 6/1993 | Ikebe et al. | 123/531 |

*Primary Examiner*—Raymond A. Nelli
*Attorney, Agent, or Firm*—Bielen, Peterson & Lampe

[57] ABSTRACT

A universal combustion system for positive displacement thermal engines enabling use of different kinds and types of fuels the combustion system including a premix and precombustion module that is connected to the main combustion chamber of the engine for premixing air and fuel in a premix chamber in the module that is isolated from the main combustion chamber, the module having automatic control means coordinated with the compression cycle of the engine for premixing fuel and air in the premix chamber and releasing the mixture into the main combustion chamber at an opportune time in the engine cycle.

11 Claims, 4 Drawing Sheets

FIG_2

UNIVERSAL COMBUSTION SYSTEM

BACKGROUND OF THE INVENTION

This invention relates to a universal combustion system for thermal devices, in particular for positive-displacement, thermal engines where use of different kinds of fuel is advantageous, and in particular, where high compression ratios or supercharging make existing systems inefficient or inoperative. The universal combustion system of this invention is an improvement over the system described in our patent, "Multi-Fuel Precombustor Unit", U.S. Pat. No. 5,224,450, issued Jul. 6, 1993, and incorporated herein by reference. The universal combustion system utilizes certain features for automatic actuation in conjunction with the engine cycle in co-pending application, Ser. No. 08/613,839 filed Mar. 11, 1996, entitled, "Self Injection System."

The universal combustion system is designed to permit advances in engine efficiency through high compression ratios and clean burning of fuels to be extended to fuels of lower quality or of different type, such as natural gas. As a result of increasingly stringent air quality regulations related to the products of combustion from internal combustion engines, new fuel formulations are being required for vehicles in the industrialized countries. Not only do the new fuel formulations add significantly to the cost of fuel, such formulations are not available in most other parts of the world. The inability of spark ignited engines to adapt to low quality fuels without substantial loss in power and performance has created a great economic burden for the world population. Additionally, the migration toward more sophisticated gasoline formulations to ensure clean burning in modern high-performance engines, has limited the fuel products available from existing oil reserves and restricted the competitiveness of alternative fuels such as alcohol and natural gas.

Ordinarily, the methane, octane and cetane numbers affect the type of fuel that can be burned in an internal combustion engine without inefficient combustion. In modern spark ignited engines burning gasoline, the increased pressure ratio and elimination of the anti-knock compound, tetraethyllead, has required the addition of more expensive exotic additives to achieve the octane rating necessary to prevent detonation.

Similarly, cetane fuels such as jet fuel (kerosene) and diesel fuel (gas oil) are not efficiently combusted in spark-ignited engines designed for lighter gasoline fractions.

Finally, for gaseous fuel such as methane, or natural gas, the displacement of air by the gaseous fuel in the charging cycle greatly reduces the generated thermal energy and efficiency of the engine. Supplemental compression to compensate for performance loss will frequently result in premature detonation.

Similar limitations are associated with the admission of air and gasoline mixtures into the cylinder via a carborator, or by fuel injection into the intake port, or in any situation where autoignition prior to the timing of the controlled ignition may result.

Because of the variations in fuel characteristics, engines designed for one type of fuel cannot utilize another type without extensive modification in the physical structure of the fuel delivery system and engine.

It is a primary object of this invention to resolve the problems in switching fuel by a system that may be regulated, preferably by an electronic control system, to operate with a variety of different fuels. With the universal combustion system of this invention, the most cost competitive fuel or the locally available fuel can be used. Since the system compensates for the characteristics of the fuel, regardless of octane and cetane number, then a variety of fuels, including common oil derived fuels, alcohols, and combustible gases can be used. In addition to convenience, great savings in cost can be effected by the use of cheaper fuels and the lower prices that result in the competition from a variety of different useable fuels.

SUMMARY OF THE INVENTION

The universal combustion system of this invention is designed to enable new and existing positive displacement internal combustion engines to operate on a variety of types and kinds of fuel. In particular, the universal combustion system of this invention is designed to operate with liquid or gaseous fuels having different caloric value or combustion characteristics. The combustion system operates by selectively isolating a fuel charge from the combustion chamber until the opportune moment of optimized release into the combustion chamber. This timed release depends on the combustion characteristics of the fuel being utilized and considers such factors as the state of the fuel as liquid or gas, the methane, octane or cetane number of the fuel, the caloric value and the combustion profile including its detonation propensity for a given air/fuel mixture.

The universal combustion system includes a premix chamber where fuel and residual combustion gases may mix in a volume isolated from the combustion chamber before release into the combustion chamber, where a final mixture with compressed air results in combustion for the power phase of the chamber cycle. Where desired, air is admitted to the premix chamber in controlled quantities to improve the composition of the fuel mixture for the subsequent combustion process for a selected fuel, particularly liquid fuels.

By isolating the precombustion fuel mixture from the combustion chamber, a high compression ratio can be maintained, even for lean mixtures without premature combustion occurring. Once the optimum time in the compression phase (or early in the power phase) is reached, the isolated fuel mixture is released for admixture with the compressed air in the main combustion chamber for optimized burning for the selected fuel. Since the pressure of the rich fuel mixture in the premix chamber when isolated is controlled at a desired level below the detonation pressure and at a level below the developed level of compressed air in the compression phase of the operating cycle, combustion will not occur until the trapped gases of the fuel mixture are released by communication of the premix chamber with the combustion chamber. This permits the engine to operate at any desired compression ratio or supercharging level, allowing the degree of compression to be optimized independently of considerations for premature combustion or detonation. The level of air compression can then be tailored for the type, kind and quantity of fuel being utilized to optimize the power or fuel efficiency of the engine operation depending on the load and operation demands of the moment.

The admission of fuel into the premix chamber may begin at the end of the expansion phase of the engine cycle and may continue during the exhaust, intake and initial compression phases in a four-cycle engine, or 540° of rotation. Therefore, ample opportunity for admission of a proper quantity of fuel, whether liquid or gas, may be effected before the time release of the fuel mix into the primary combustion chamber. The system of this invention closely integrates the fuel delivery and the operation of the valve system for releasing mixed gases in the premix chamber with the operation of the engine cycle, achieving automatic operation of many functions in the system process. This improvement reduces the parameters required for electronic control and greatly simplifies the switch from one fuel to another. By coordinating air supply and valve actuation with the operating cycle of the engine, the electronically controlled actuators for these subsystems can be eliminated with savings in cost and improved reliability.

The universal combustion system is designed for positive displacement engines, including rotary engines, and has particular application for reciprocal engines of the piston and cylinder type as described in the preferred embodiments of the detailed description.

DETAILED DESCRIPTION OF THE PREFERRED EMBODIMENTS

Figure 1:
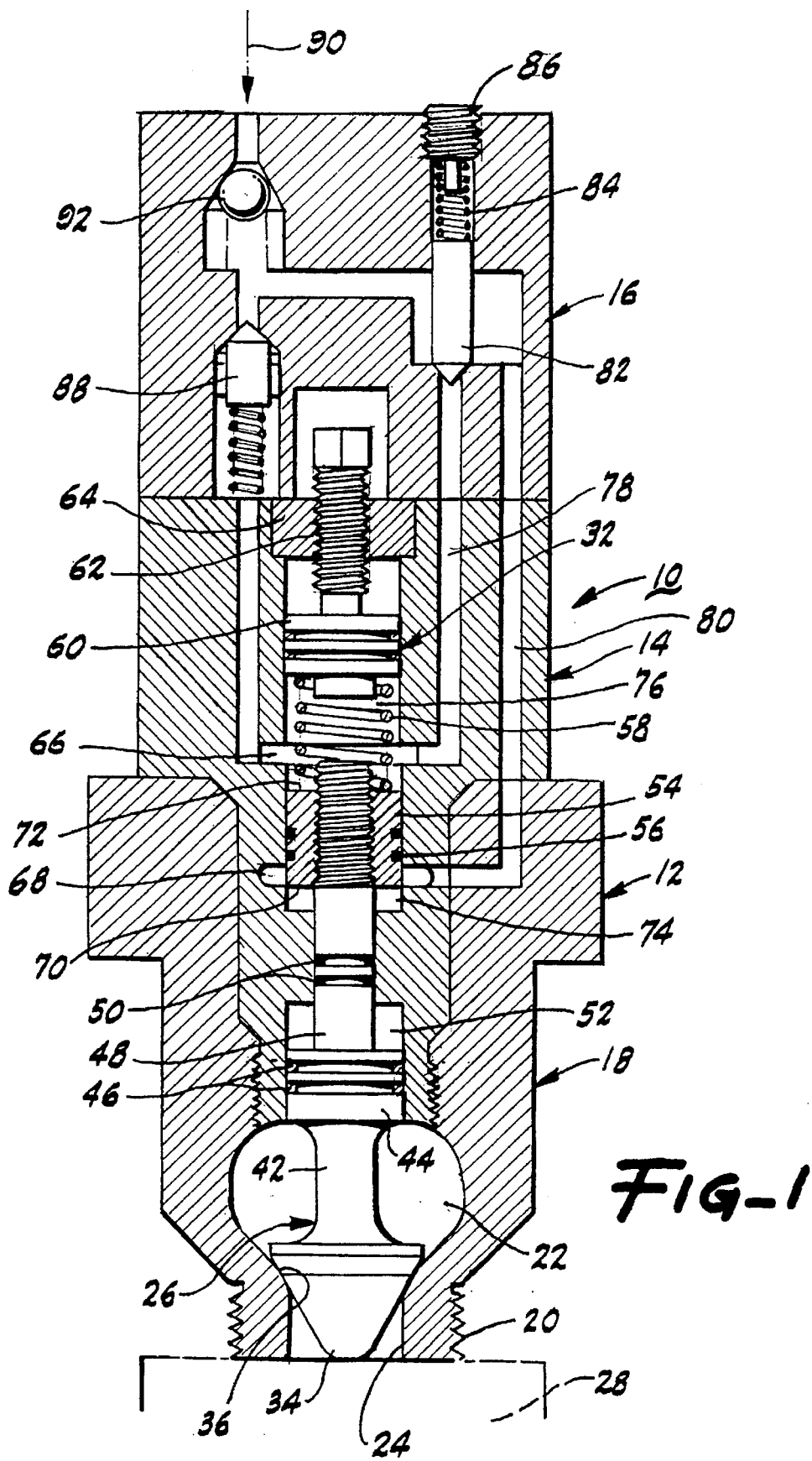
FIG. 1 is a cross sectional view of the main body of the premix and precombustion module of the universal combustion system.

Referring to the cross sectional view of FIG. 1, a universal combustion module 10 for a universal combustion system is shown. It is to be understood that the system includes an internal combustion engine for example a piston and cylinder, reciprocal engine schematically shown in part in FIG. 4.

The universal combustion module 10 includes a housing or main body 12 with an interconnected mid section 14, an end section 16 and a base 18. The main body 12 also has means for connecting the module 10 to an engine. In FIG. 1, the combustion module is configured similar to a fuel injector with a threaded neck 20 connectable to a threaded port in the head or block of the engine in communication with the combustion chamber. The base 18 of the main body 12 houses a premix and precombustion chamber 22 with a discharge port 24 and a central piston valve 26 separating the premix chamber 22 from the discharge port 24. The discharge port 24 provides a direct opening to a combustion chamber, for example, the combustion chamber 28 of the piston engine 30 in FIG. 4.

Also housed in the main body 12 is an actuator assembly 32 for displacement of the central piston valve 26 for timed communication of the premix chamber 22 with the combustion chamber via the discharge port 24. A fuel delivery assembly in the main body 12 is shown in the enlarged, partial cross-sectional view of FIG. 2 and in the enlarged schematic view of the alternate embodiments in FIGS. 3–4. In the preferred embodiments, the fuel delivery assembly includes an air/mix system that is coordinated with the engine cycle to deliver a burst of compressed air into the premix chamber 22 to form a turbulent, fuel-rich mixture in the premix chamber 22 for controlled ignition and burning. In certain configurations of the universal combustion system the air-mix system may be omitted or modified since the universal combustion module is designed for a variety of existing and new engines.

Figure 3:
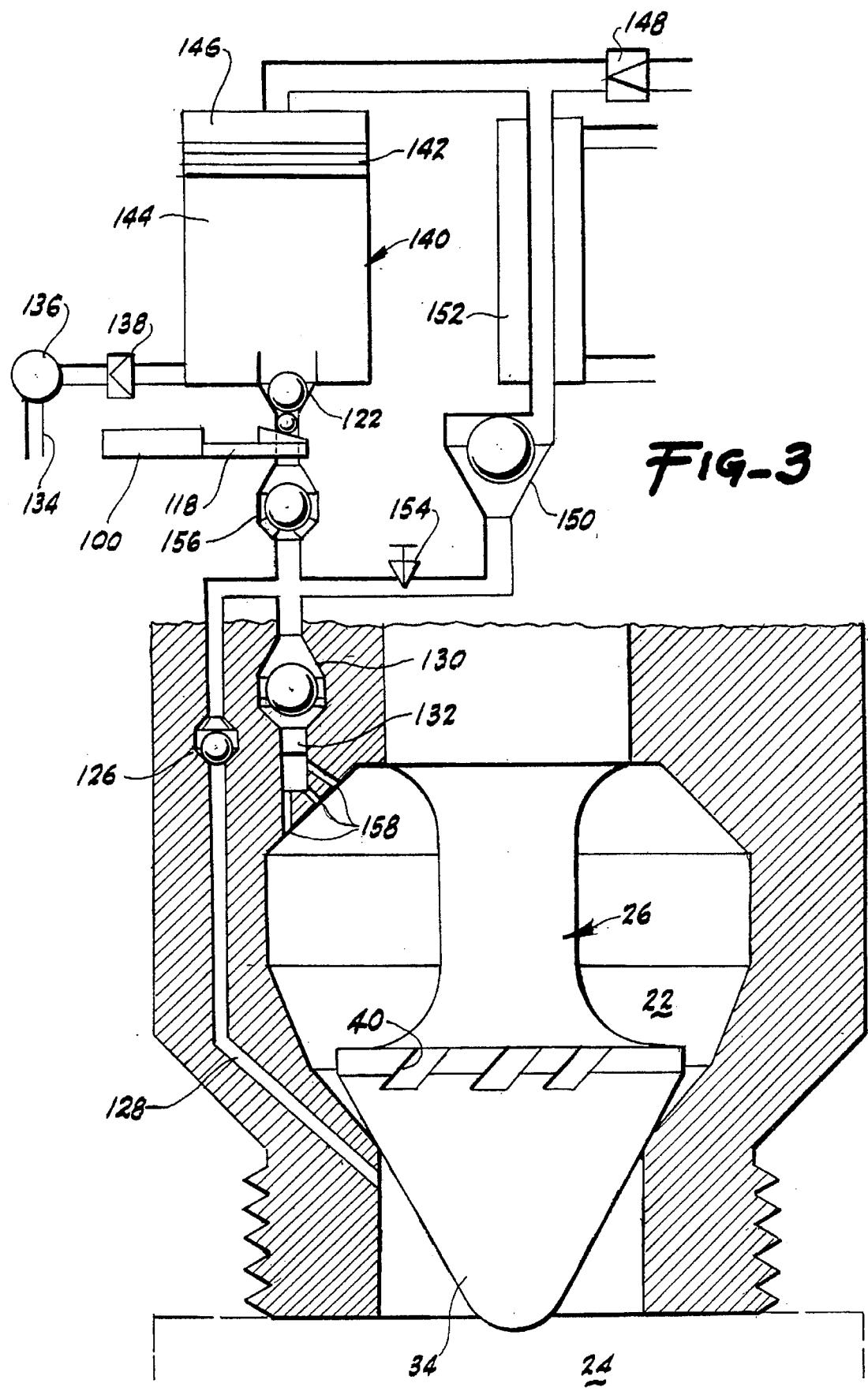
FIG. 3 is a schematic view of an alternate embodiment of the universal combustion system.

The central piston valve 26 has a conical, contoured valve head 34 that seats on a shoulder-like valve seat 36 of the discharge port 24 where the port communicates with the premix chamber 22 and seals the premix chamber 22 from the combustion chamber when seated. When the piston valve 26 is retracted, the contoured head 34 forms a nozzle guide between the annular premix chamber 22 and the cylindrical or circular opening of the port 24. As shown in FIG. 3, notches 40 on the head 34 aid in adding a swirl to entering and exiting gases during the fuel burn as it proceeds from the premix chamber 22, functioning as a precombustion chamber, to the combustion chamber 28.

The central piston valve 26 has a constricted neck 42 to maximize the volume of the premix chamber 22 and a guide piston 44 with piston rings 46 and a guide stem 48 with O-rings 50 for maintaining the alignment of the piston valve 26 and for providing a draining chamber 52 for gases or hydraulic fluid escaping past the seals. Such gases or fluid are purged to the premix chamber 22 on retraction of the central piston valve 26.

At the end of the guide stem 48 is fixed a double acting hydraulic piston 54 with seals 56 biased by a compression spring 58 seated against adjustable stop 60. The stop 60 is positioned by a threaded stem 62 in a threaded block 64 to permit adjustment of the compression force of the compression spring 58.

An upper hydraulic chamber 66 and lower hydraulic chamber 68 are designed to cooperate with the ends 70 and 72 of the displaceable double acting piston 54 to provide a cut-off, trapping fluid in end pockets 74 and 76 which act as cushioned stops for the displacement of the central piston valve 26. Channels 78 and 80 connect the upper and lower hydraulic chambers 66 and 68, respectively in the mid section 14 to valving in the end section 16. A needle valve 82 biased by a compression spring 84 with the compression force controlled by an adjuster plug 86 regulates flow of hydraulic fluid from the upper hydraulic chamber 66.

Biased by the main compression spring 58 that forces the central piston valve 26 to the closed position shown in FIG. 1, retraction or opening is caused by the pressure within the main combustion chamber 28 during the compression phase of the engine cycle. Pressure against the head 34 is transmitted to fluid pressure in the upper hydraulic chamber 76 trapped by a check valve 88 and the adjustable needle valve 82. Once the pressure exceeds the control pressure of the needle valve 82, the valve opens allowing displacement of the central piston valve 26 against the compression spring 58. Fluid in the upper chamber 66 displaced by the moving double acting hydraulic piston 54 flows to the lower chamber 68 allowing gradual opening of the port 24 allowing communication of the premix chamber 22 with the combustion chamber 28.

Once the combustion is completed and pressure drops during the expansion phase of the engine cycle, the compression spring 58 gradually returns the central piston valve to the closed position trapping low pressure products of combustion in the premix chamber 22. Fluid displaced in the lower hydraulic chamber 74 is returned to the circuit bypassing the check valve 88 and filling the upper chamber 66. Any fluid lost in the operating cycle is replenished from a pressurized hydraulic fluid line 90 through fluid supply check valve 92.

Figure 2:
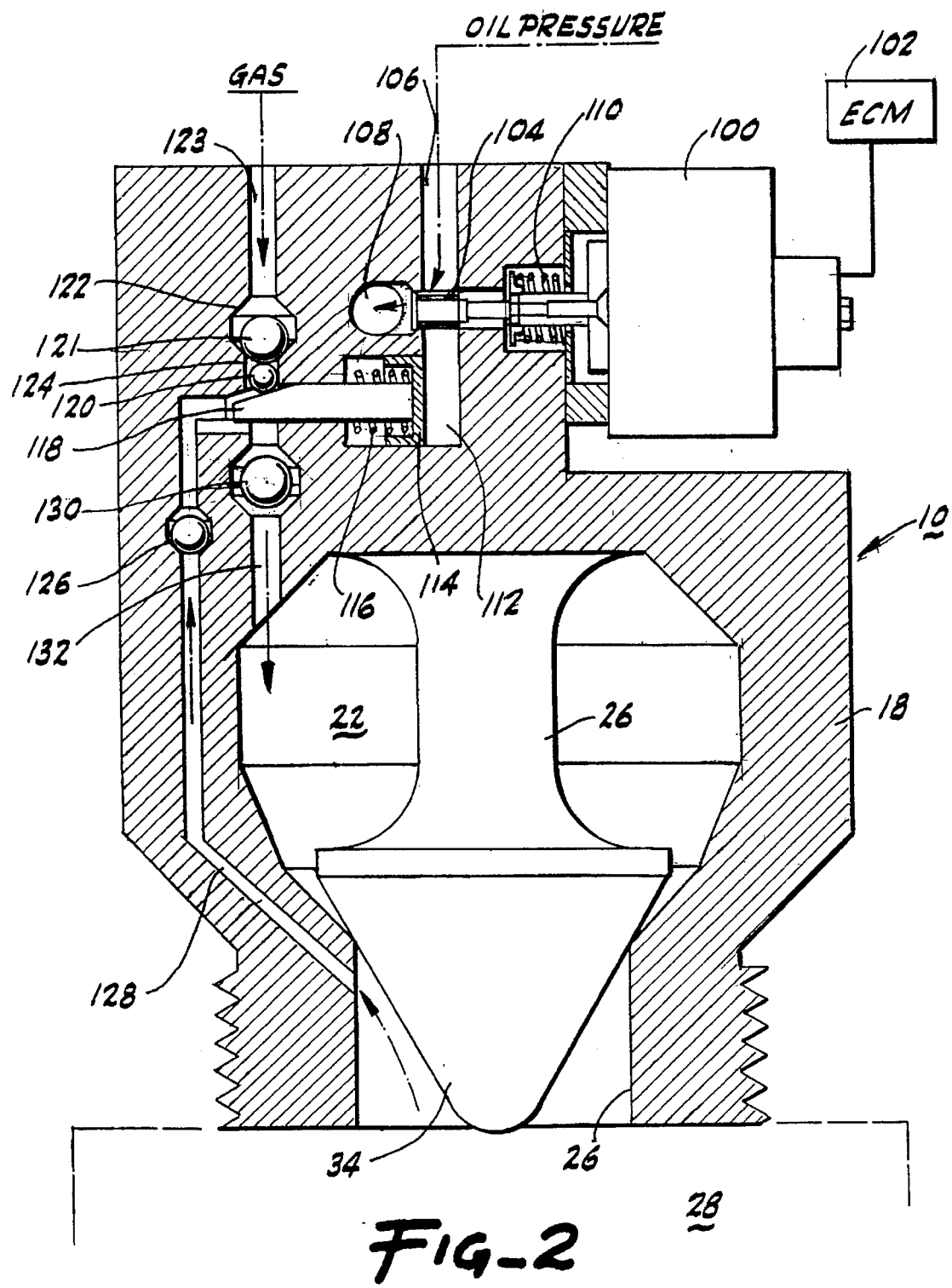
FIG. 2 is an enlarged cross sectional view of a portion of the main body of the pre mix and precombustion module of FIG. 1.
Figure 4:
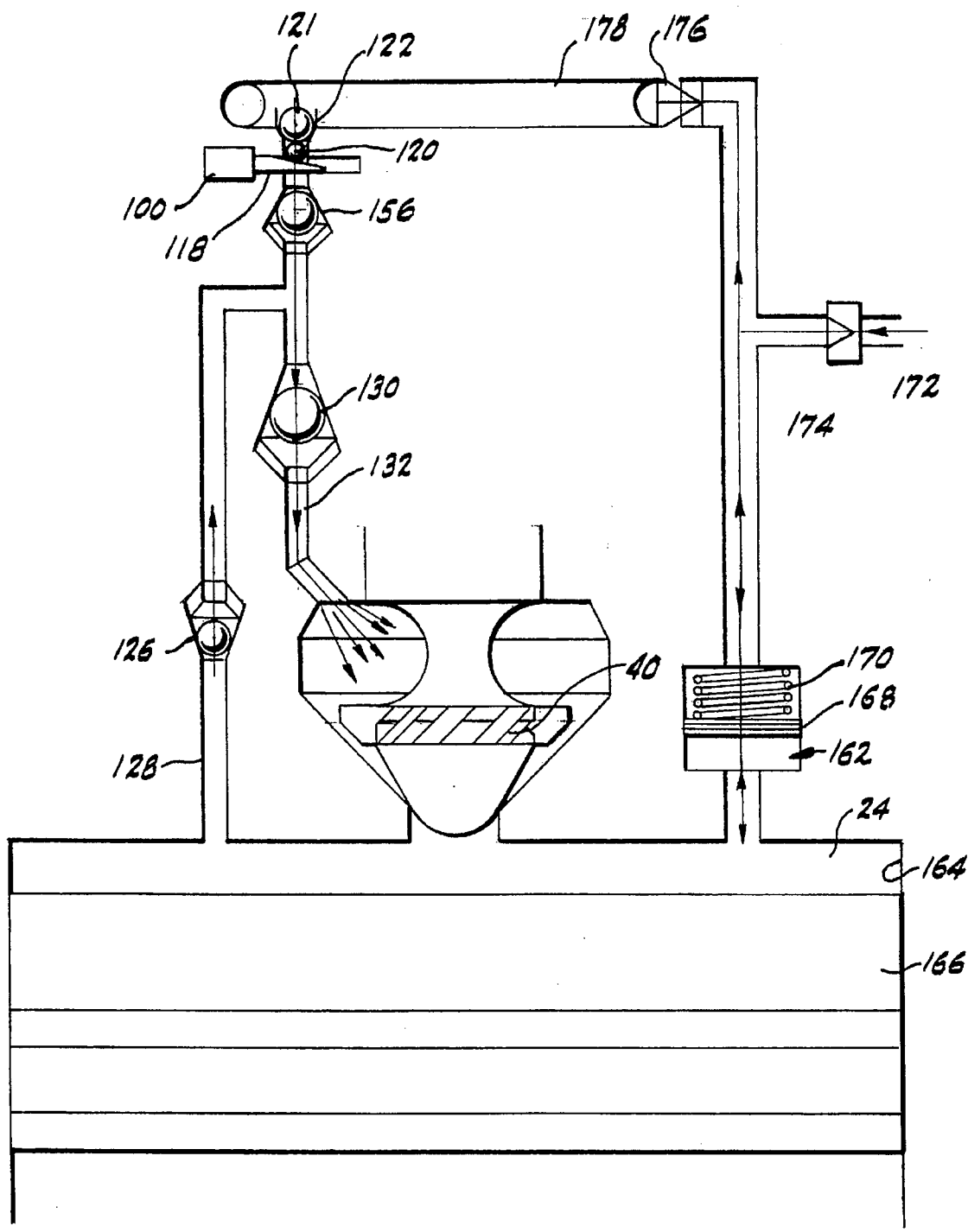
FIG. 4 is a schematic view of a further alternate embodiment of the universal combustion system.

Fuel delivery is coordinated with the self-acting central piston valve 26 as shown in the alternate embodiments of FIGS. 2–4. Referring to FIG. 2, an enlarged cross-sectional view of the base 18 of the universal combustion module 10 is shown. An electronically controlled solenoid actuator 100 is regulated by an electronic control module 102 which is preprogrammed with both the normal demand profiles for operational control of the engine performance and with fuel profiles for a menu of fuel kinds and types. In this manner, a single fuel delivery system in the universal control module 10 can accommodate different liquid and gaseous fuels using the same passages by varying the duration of the feed. Where gaseous fuels of extraordinary low caloric value are used, raising the pressure of the storage vessel will accommodate for the additional fuel flow required for desired power. As noted, approximately 540° of cycle time is available to insure the proper fuel charge is delivered.

The electronically controlled solenoid actuator 100 operates a poppet valve 104 in the hydraulic fluid line 106 which cycles pressurized hydraulic fluid to the return line 108. The solenoid actuator 100 is small, since minimal force is required to move the poppet valve 104 against return spring 110 to a closed position routing hydraulic fluid to a piston chamber 112 when the solenoid actuator 100 is electronically actuated. When actuated, hydraulic fluid acts against amplifier piston 114 displacing the piston 114 against return spring 116 and moving a connected wedge stem 118 against a cam ball 120 which raises a ball 121 of a check valve 122 allowing fuel under pressure to flow through fuel delivery passage 123 around the cam ball 120 through channels 124 to the premix chamber 22. Fuel admission may be commenced at the end of the expansion stroke when the premix chamber 22 is sealed from the combustion chamber 28. A check valve 126 prevents the pressurized fuel from flowing into the combustion chamber 28. However, once the compression phase of the engine cycle commences and the compressed air in the combustion chamber 28 exceeds the relatively low pressure of the fuel, air is admitted through a small diameter channel 128 that communicates with the combustion chamber 28. The air stream mixes with the diminishing fuel stream as the rich air/fuel mixture enters the premix chamber 22 to further mix with the resident hot gases of the last cycle combustion. Since air flow is independent of fuel flow, the air flow may commence after fuel flow has halted by action of the solenoid actuator 100. In no event can fuel flow continue after air flow pressure exceeds fuel flow pressure closing check valve 122. Thus, the air flow purges the internal channels of any residual fuel until the combustion chamber reaches the desired pressure to cause the displacement of the central control piston 26 and combustion of the gas mixture in the premix chamber. Backflow from the premix chamber 22 during combustion is prevented by a check valve 130 in the common feed line 132 to the premix chamber. Additionally, because of the small diameter of the air channel 128, prior to combustion the pressure of the premix chamber is less than the combustion chamber providing a pressure differential between the chambers for vigorous mixing of compressed air from the combustion chamber on retraction of the piston valve 26 and initiation of the burning process. In low pressure systems, combustion may be initiated by a spark ignition or glow plug as described in the referenced patent.

In the modified system of FIG. 3, the fuel is pressurized by the compressed air in the compression phase of the engine cycle. This is particularly useful where low Btu gases comprise the fuel, although pressurization of liquid fuels at the maximum combustion pressure is advantageous for developing a high-velocity spray into the premix chamber for improved vaporization.

As schematically shown in FIG. 3, compressed air in the air supply channel 128 passes check valve 126 and mixes with any fuel in the common feed line 132. Fuel supply is controlled by actuation of the wedge stem 118 against the ball operated check valve 122. Fuel from a low pressure fuel line 134 is pumped by a fuel pump 136 through a check valve 138 to a pressure tank 140 having a floating piston 142 dividing the pressure tank into a fuel chamber 144 and an air chamber 146. Fuel pumped into the fuel chamber 144 raises the piston 142 and displaces air in the air chamber 146 through an opened release valve 148.

When the engine is cycled during starting, compressed air in the main combustion chamber 24 is fed through the air supply channel 128, a check valve 150 for the air chamber 146 and a cooler 152 before entering the air chamber 146 to pressurize the fuel. A separator valve 154 divides the air flow between the premix chamber 22 and the air chamber 146 of the fuel tank and may be adjusted to insure optimized air flow to the premix chamber. Backflow of fuel or air into the fuel chamber 144 is prevented by check valve 156. Preferably, a pair of pressure tanks 140 are used in tandem for continuous operation where one is filled while the other is emptying. Since high pressure fuel is delivered, multiple small nozzles 158 are connected to the common channel 132 to provide a high pressure spray resulting in a swirl, deflected by channels 160 in the head 34 of the central piston valve 26.

In the schematic illustration of FIG. 4, an alternate self-injection system is shown. A small piston chamber 162 is in communication with the combustion chamber 24, here a cylinder 164 with a reciprocal piston 166. The small piston chamber 162 has a piston 168 biased by a compression spring 170. Fuel from a fuel line 172 passes a check valve 174 protecting the fuel line 172 and a check valve 176 protecting a common rail 178. During the end of the compression stroke and beginning of the expansion stroke the peak combustion chamber pressure is transmitted to the fuel by the displaceable piston 166.

In this manner, fuel in the common rail 178 is maintained at virtually the peak pressure of the compressed chamber by the high pressure feed pulse of fuel in each cycle.

In a similar manner to the prior embodiments, air admitted through air channel 128 mixes with the tail end of fuel admitted under control of the solenoid actuator 100 in the common channel 132 and in the premix chamber. As noted, air follows the fuel cutoff to purge the line of any fuel residuals to prevent carbonization or fuel waste.

The universal combustion system of this invention maximizes the feature of self-regulation by integrating many of the fuel and air delivery systems with the natural operation of a positive displacement engine. Where external control is effected, it is focused at the timing and duration of the fuel pulse delivered to the premix chamber. With this focus, the electronic control module can make instant adjustment for changes in the nature of the fuel being utilized without changes in the system hardware.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An improved premix and precombustion module for positive-displacement thermal engine having a main combustion chamber and compression means for generating compressed air in the main combustion chamber, the improved premix and precombustion module comprising:

a main body with connection means for connecting the premix and precombustion module to the thermal engine, the main body having an internal premix chamber with a discharge port in communication with the main combustion chamber when the premix and precombustion module is connected to the thermal engine;

a central piston valve displaceable in the main body, the central piston valve having a valve head and the discharge port having a valve seat, wherein the head seats on the valve seat and blocks communication of the premix chamber with the main chamber when the piston valve is displaced toward the discharge port;

actuating means connected to the central piston valve for selectively displacing the valve head into seating engagement with the valve seat wherein the discharge port is closed, and for retracting the valve head from a seating engagement with the valve seat wherein the discharge port is open and the premix chamber communicates with the main combustion chamber;

air passage means between the main combustion chamber and the premix chamber having a passage and a check valve means in the passage for automatic passing of compressed air in the main combustion chamber to the premix chamber when pressure of compressed air exceeds pressure in the premix chamber, the check valve means blocking the passage from the premix chamber to the main combustion chamber when pressure in the premix chamber exceeds the pressure in the main combustion chamber; and, controlled fuel delivery means for timed delivery of fuel under pressure to the air passage means.

2. The improved premix and precombustion module of claim 1 wherein the controlled fuel delivery means includes a fuel supply passage that communicates with the passage of the air passage means, the fuel supply passage having a check valve means for automatically blocking the fuel supply passage from the air passage means when compressed air in the air supply passage means exceeds the pressure of fuel in the fuel supply passage, wherein fuel passed to the air passage means is scavenged by compressed air in the air passage means after the fuel supply passage is blocked by the check valve means of the fuel supply passage.

3. The improved premix and precombustion module of claim 1 wherein the actuating means comprises a double acting piston on the central piston valve, the main body comprising a housing with internal upper hydraulic chamber and lower hydraulic chamber separated by the double acting piston, the actuating means further comprising a compression spring means in the upper chamber for contacting the double acting piston and biasing the central piston valve to the closed position; a hydraulic fluid supply means for supplying hydraulic fluid to the upper chamber under pressure, supplementing the force of closure of the compression spring of the central piston valve; and hydraulic fluid release means with adjustable pressure control valve means for automatically releasing hydraulic fluid from the upper chamber when pressure of the compressed air in the main combustion chamber acting on the head of the central valve is transmitted by the double acting piston to the hydraulic fluid, and the hydraulic fluid in the upper chamber reaches a predefined pressure.

4. The improved premix and precombustion module of claim 3 wherein the housing includes a hydraulic fluid passage from the upper chamber to the lower chamber and the adjustable pressure control valve means releases hydraulic fluid from the upper chamber to the lower chamber.

5. The improved premix and precombustion module of claim 4 wherein the adjustable pressure control valve means comprises a needle valve with a compression spring biasing the needle valve to a closed position and with an adjuster means for controlling the compression force of the compression spring.

6. The improved premix and precombustor module of claim 1 wherein the controlled fuel delivery means includes a fuel supply passage and an electronically activated valve means for regulating flow of fuel in the fuel supply passage.

7. The improved premix and precombustion module of claim 6 wherein the electronically activated valve system includes a hydraulically actuated valve in the fuel supply passage, a pressurized hydraulic fluid supply to the hydraulically actuated valve.

8. The improved premix and precombustion module of claim 1 further comprising:

a pressurized fuel supply tank having a floating piston dividing the tank into a fuel chamber and an air chamber;

a fuel supply means with a check valve for supplying fuel to the fuel chamber and preventing backflow from the fuel chamber to the fuel supply means; and air supply means with a check valve for supplying air from the air passage means to the air chamber and preventing backflow from the air chamber to the air supply means.

9. The improved premix and precombustion module of claim 8 wherein the air supply means includes adjustable valve means for regulating the flow of compressed air from the main combustion chamber to the premix chamber and to the air chamber of the fuel supply tank.

10. The improved premix and precombustion module of claim 1 further comprising:

a fuel supply with a fuel line having a check valve means for protecting the fuel supply from backflow in the fuel line;

a common rail connected to the fuel line with check valve means for blocking backflow of fuel from the common rail to the fuel line; and a piston chamber having a piston dividing the chamber into a first portion in communication with the main combustion chamber and a second portion in communication with the fuel line, the second portion containing a compression spring biasing the piston against pressure from compressed gases in the combustion chamber, wherein pressure of gases in the combustion chamber is transmitted to fuel in the fuel line and peak pressures of fuel in the fuel line are transmitted to fuel in the common rail.

11. The improved premix and precombustion module of claim 3 wherein the compression spring means includes a compression spring and adjustment means for adjustment of the compression force of the compression spring.

* * * * *